United States Patent

[11] 3,626,291

| [72] | Inventors | Donald W. Yauch; Paul A. Lilie, both of Columbus, Ohio |
|---|---|---|
| [21] | Appl. No. | 823,909 |
| [22] | Filed | May 12, 1969 |
| [45] | Patented | Dec. 7, 1971 |
| [73] | Assignee | Halmar Electronics, Incorporated Columbus, Ohio |

[54] CURRENT-MEASURING APPARATUS
10 Claims, 6 Drawing Figs.

[52] U.S. Cl. ..................................... 324/127, 324/117 R
[51] Int. Cl. ..................................... G01r 1/22, G01r 33/00
[50] Field of Search ............................ 324/127, 117

[56] References Cited
UNITED STATES PATENTS

| 2,345,430 | 3/1944 | Rich ............................ | 324/127 |
| 3,465,250 | 9/1969 | Schilling ...................... | 324/127 |

FOREIGN PATENTS

| 368,266 | 2/1939 | Italy ............................ | 324/127 |
| 1,281,545 | 10/1968 | Germany ..................... | 324/127 |

Primary Examiner—Rudolph V. Rolinec
Assistant Examiner—Ernest F. Karlsen
Attorney—Wood, Herron & Evans ABSTRACT: Apparatus including a set of adjacent coils which form a closed path adapted to be closed about a current-carrying conductor. The voltage output from said coil, which is induced by the closing movement or by changes in the conductor current, is integrated. The integrated value of said voltage being proportional to the current flowing through said conductor.

PATENTED DEC 7 1971　　3,626,291

INVENTORS
Donald W. Yauch
Paul A. Lilie
BY Wood, Herron & Evans
ATTORNEYS

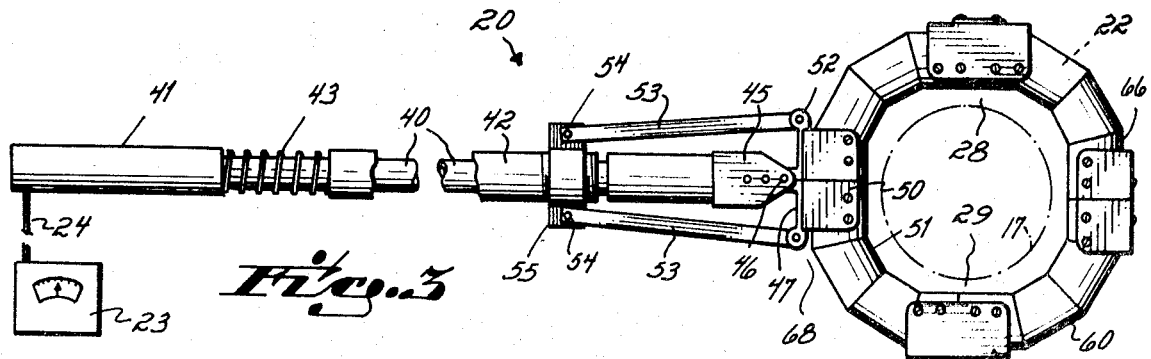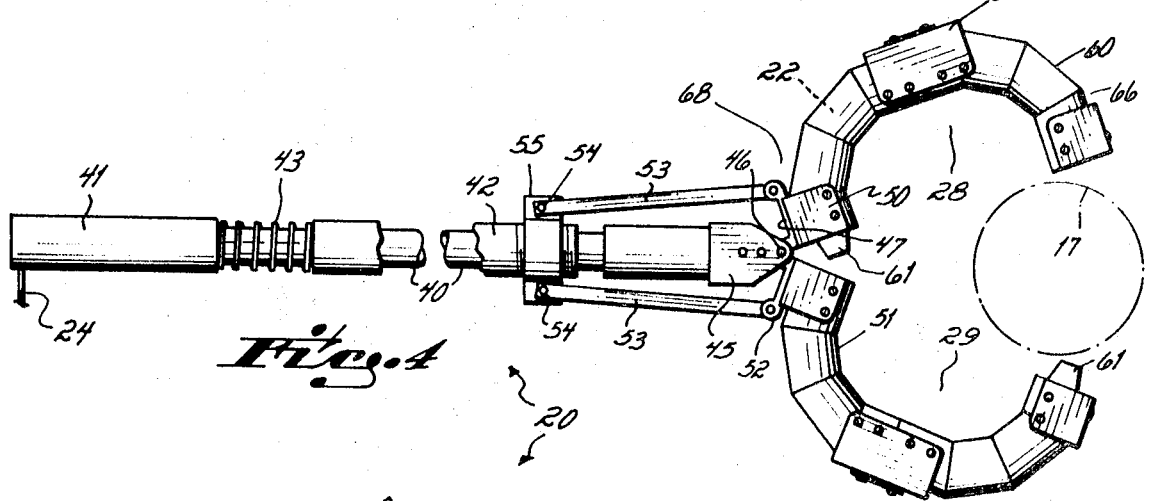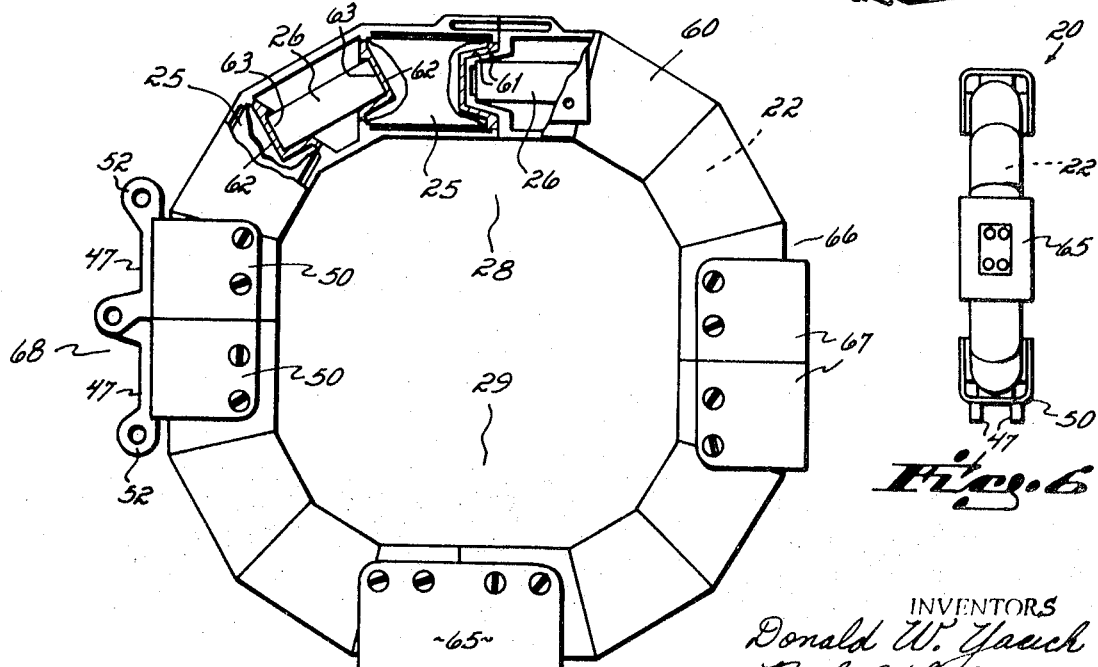

CURRENT-MEASURING APPARATUS

This invention relates to apparatus for measuring direct current flowing through a conductor. The invention is particularly adapted for sampling extremely large currents, that is many thousands of amperes, flowing through conductors used in electrolytic processes.

By way of example, one environment wherein the invention has significant application is a reduction cell wherein aluminum is extracted from a molten electrolyte. In general the molten electrolyte is contained in a carbon-lined shell, the carbon forming the cathode in the electrolytic process. A plurality of carbon anodes are supported from a common bus with their lower ends in the molten electrolyte. As the process take place, the electrolyte which is $Al_2O_3$ is reduced to aluminum.

In this cell, it is desirable that all anodes carry approximately the same current. If for one reason or the other one of the anodes carries substantially different current than the remaining anodes, one of a number of undesirable effects will be produced. Anodes set too low may allow projecting points to touch the metal layer in the bottom of the cell, thus short-circuiting it; anodes set too high may, because of the resistance of the thicker layer of electrolyte between them and the cathode, fail to carry their proper share of the current.

One of the present practices involving the control of the current distribution in the anodes is simply visual. When one of the anodes begins to carry so much current that it heats up, it will turn red and a workman will know to raise that anode thereby tending to equalize the distribution of the current.

An objective of the invention has been to provide a current measuring device which is adapted to be carried by a workman and clamped on a conductor, such as an anode stem, to provide a measurement of the average current in the conductor without requiring more than a few seconds manipulation.

Another objective of the invention has been to provide the combination of a split sensing coil adapted to be closed about a conductor, an integrating circuit connected to the output of said coils, to integrate the voltage induced during the closing period and while clamped around the conductor, and a meter connected to indicate the current directly.

Another objective of the invention has been to provide a sensing coil which is economical to produce, the sensing coil including a series of large and small coils wound on linear axes each small coil alternating with a large coil and having its ends inserted into the ends of the adjacent large coil.

These and other objectives of the invention will become more readily apparent from the following detailed description taken in conjunction with the accompanying drawings in which:

FIGS. 3 and 4 are plan views of the toroid coil and the manner in which it is mounted on a handle and its operation.

FIG. 5 is a plan view, partly in section, illustrating the structure of the toroid coil, FIG. 6 is an end elevational view of the toroid coil.

Figure 1:
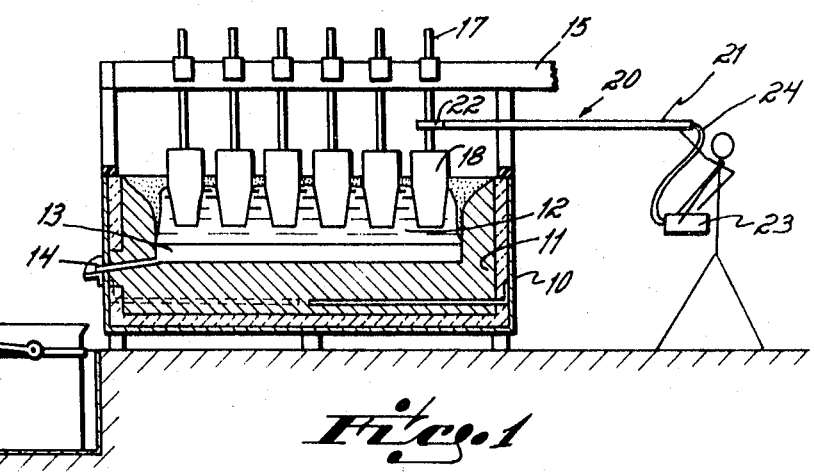
FIG. 1 is a diagrammatic illustration of an environment in which the invention may be used.

One example of the manner in which the invention is used is illustrated generally in FIG. 1. While in this instance the invention will be described in relation to its use in measuring the anode current in an aluminum reduction cell, it is to be well understood that the invention has obvious applications in other environments.

As shown in FIG. 1, the cell includes a steel shell or tank 10 having a carbon inner-liner 11. The molten alumina ($Al_2O_3$) is contained within the tank and is indicated at 12. As the alumina is reduced to aluminum, the aluminum settles to the bottom of the tank as indicated at 13 and from time to time is drained off through the drain indicated at 14.

A bus 15 is mounted over the tank and carries a plurality of anode stems 17 having carbon anode blocks 18 at their lower ends. Each bus may carry from two to 50 anodes, for example, and the objective of the invention is to provide apparatus for measuring the current in each anode stem.

That apparatus is indicated very generally at 20 and includes a handle 21 and a sensing coil 22 at the end of the handle.

An integrating circuit and meter 23 is connected through leads 24 to the coils, the meter providing a direct reading of the current in the anode.

Figure 2:
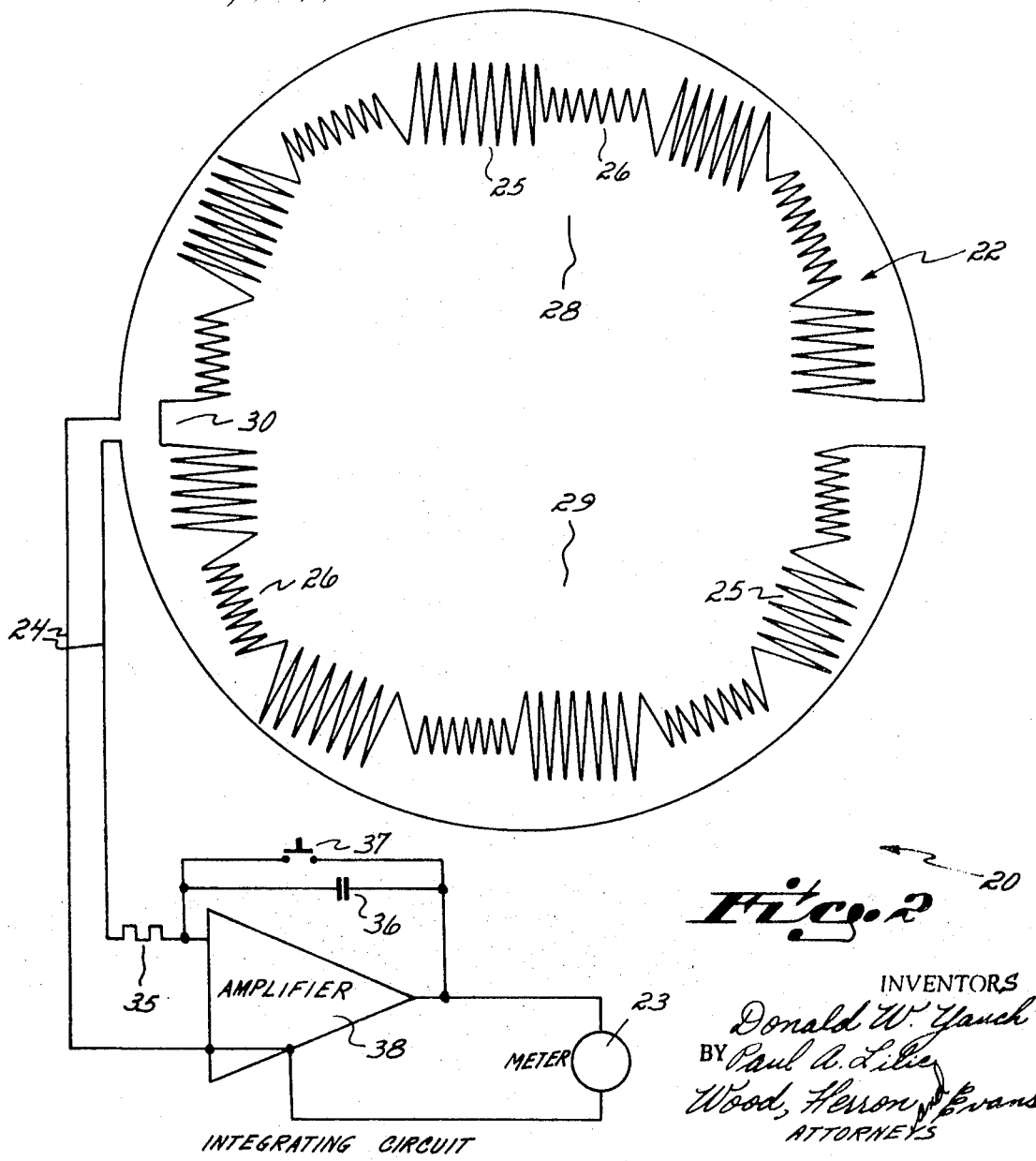
FIG. 2 is a circuit diagram of the invention.

The electrical circuit is diagrammatically illustrated to FIG. 2. That circuit includes as its principal detecting element, the sensing coil 22. The use of coils generally is known and has been described in applications involving the measurement of large alternating currents. See *Electrical Engineering Transactions*, Jan. 1944, pp. 38–40. In one version of the present invention the sensing coil is formed of eight large coils 25 each of which is wound on a linear axis and eight small coils 26 each of which is wound on a linear axis. The area enclosed by a turn of each large coil is four times that of a small coil and each small coil has four times the number of turns per unit of length as the large coils. Since the voltage generated by each coil cutting the lines of flux is proportional to the number of turns per unit length and to the area, equating the product of the area and number of turns per unit length for each coil makes the total coil insensitive to position on the conductor.

The toroid coil is divided into two halves 28 and 29 so that it can be opened up and then closed about a conductor. Each coil half includes alternating large and small coils which are electrically connected in series and which are mechanically located in end-to-end relation with some of the coils being at a slight angle to their adjacent coils in order to form a closed loop. At one end, the coil halves are series connected as shown at 30. At the other end, the end coil is connected by a lead 24 to the integrating circuit. Thus the leads 24 come together where the the coil halves are joined so that a minimum of flexing of the leads is required for the operation of the device.

The integrating circuit to which the output leads 24 of the toroidal coil are connected includes a resistor 35 and a capacitor 36. A zeroing switch 37 is connected across the capacitor 36. The integrating circuit includes an operational amplifier 38 and the output of the integrating circuit is connected to a direct reading meter 23.

The structure by which the coil is mounted is illustrated in FIGS. 3, 4 and 5. The device 20 has the handle 21 on one end and the coil 22 on the other. The handle includes a tube 40 having a grip 41 fixed at one end. A sliding grip 42 is mounted on the tube 40 and is urged by a spring 43 toward a closed position, the spring being mounted around the tube 40 and between the fixed grip 41 and the slidable grip 42.

The opposite end of the tube from the fixed grip 41 carries a bracket 45 to which the coil halves 28 and 29 are respectively pivoted. For this purpose, the bracket has a pin 46 at its end, the pin receiving the hinge members 47 and 48 on the coil halves 28 and 29 respectively. Each hinge member includes a pair of U-shaped members 50 which are secured to a housing 51 within which the coil 22 is contained.

Each hinge member has an outwardly projecting ear 52 which is pivotally connected to one end of a link 53 the other end of which is pivoted as at 54 to a bracket 55 projecting laterally from the sliding grip 42.

By pulling the sliding grip 42 toward the fixed grip and thereby compressing the spring 43, the links 53 pivot the hinge members 47 and 48 about the pivot pin 46 thereby swinging the coil halves outwardly to open the coil as illustrated in FIG. 4.

The manner in which the coil and its housing is formed provides a loop which can be completely opened and can be completely closed, as well as providing for economy of manufacture. To this end, the coil and housing are formed from a number of substantially identical parts. The housing, made of a synthetic material such as a phenolic, includes eight housing members 60. Two right-hand and left-hand housing members enclose four coils—two large and two small 25, 26 and form a 90° section, that is, one-quarter of the loop. Each section includes four segments adapted to receive in alternating fashion the small coil 26 and the large coil 25. The ends of each section are closed by caps 61 which are adhesively secured to the 90° sections. Interiorly, the small coils 26 are held in place by retainers 62 each of which has a pocket 63 which receives the end of a small coil and permits it to project into the opening of a large coil.

The alternate coil structure has several advantages. It permits the manufacture of a sensing head which has a homogeneous sensitivity around its centerline; that is, there are no gaps where the sensitivity would be zero, and there are no overlaps where the sensitivity would be twice as great as the average. If the coils overlap or do not cover a small section of the path, then the sensing head becomes very sensitive to variations in the magnetic field. This will show up as errors as the measured bus is moved about inside the bus aperture. This will also show up as errors caused by external fields.

If one uses a coil which has a constant cross section, then the ends of the halves will leave a small gap when the measuring head is closed. This is due to the necessity of protecting the coil ends from the environment such as corrosive liquids or fumes and abrasion against the bus bar.

By inserting the small coil inside the larger one, it is possible to cause the ends of axes of the coil to just touch. This is true even if the coils are at small angles. This is of particular importance at the mating points of each half. With this arrangement, it is possible to cause the sensitive portions of the coil to just meet, while still protecting the coil from the environment. The barriers against the environment are in the form of the mating caps 61, which also assure proper positioning of the coil ends.

The end caps and the retainers are adhesively secured to their housing members and the housing members are clamped together to enclose the coils within them by a U-shaped splice 65. The two 90° sections of each half are also joined together by the splice 65. At the free ends 66 of the coil the housing members are clamped by split splice 67. At the pivoting ends 68 the housing members are clamped by U-shaped hinge members.

The size of the coil, that is its internal dimensions, can be increased simply by adding straight sections molded and formed along the lines indicated, the straight sections being inserted where the 90° sections are joined.

Space is provided between the retainers 62 and the housing walls to permit the passage of wires by which the coils are connected in series and by which a return from the free ends of the coil halves to the pivot point and handle are made.

In the operation of the invention, the operator carries the device including its meter to a conductor. He then closes the coil in air and while the coil is closed sets the meter to zero by closing switch 37 momentarily. This operation brings to zero the voltage across the capacitor 36. Immediately thereafter, the operator clamps the coil around a conductor. The movement of the coil halves in closing around the conductor induces a voltage in the coils over the period of time that there is relative movement between the coils and the conductor. That voltage is integrated over the period of closing by the integrating circuit and its total is reflected directly by the indication on the meter. Since that total is directly proportional to the current flowing through the conductor, the meter is calibrated to provide a direct reading of the conductor current. Current changes in the conductor also induce voltages in the coils which are integrated and displayed on the meter.

The circuit component including the capacitor and operational amplifier are selected to introduce minimum drift in the circuit. Hence, under steady conditions the meter reading will remain substantially constant for a constant bus current. If the bus current changes, a voltage will be induced in a direction reflecting an increase or decrease in current and accordingly will change the integrated voltage and reading on the meter. Thus the device will provide a continuous and instantaneous reading of bus current.

We claim:

1. Apparatus for measuring direct current comprising,
   a housing split into two parts,
   means for closing said housing about a current-carrying conductor,
   an air core sensing coil split into two parts, each fixedly mounted in a respective housing part,
   said coil when said housing is closed, forming a substantially complete toroid around said conductor to permit sampling of the field at all points of a path surrounding said conductor,
   means including an integrating circuit for detecting the current in the conductor by integrating the current induced in the sensing coil during the period of opening said housing from a closed position encompassing no conductor and thereafter closing the housing about the conductor,
   leads connecting said integrating circuit to said coil,
   and an output indicator connected to said integrating circuit,
   said integrating circuit being characterized in that the permissible rate of closure of said housing about the conductor is independent of the electrical characteristics of the output indicator,
   whereby substantially identical readings on the output indicator are obtainable irrespective of the rate of closing said housing or of the orientation of said housing with respect to said conductor.

2. Apparatus according to claim 1 in which said coil comprises,
   a plurality of coils wound on linear axes,
   said coils being electrically connected in series,
   means mounting half said coils end-to-end in each of said housing halves.

3. Apparatus according to claim 2 further comprising,
   means for pivotally mounting said housings with respect to each other at one of their ends,
   a handle supporting said housings, and means mounted on said handle for opening and closing said housings.

4. Apparatus according to claim 3 wherein each lead from a respective coil half passes through said handle, lies along said coil half and is connected to the free end of said coil half.

5. Apparatus according to claim 1 in which said integrating circuit comprises an active integrating circuit which derives power from a battery.

6. Apparatus for measuring direct current comprising,
   a housing split into two parts,
   means for closing said housing about a current-carrying conductor,
   a plurality of air core sensing coils mounted in respective housing parts,
   said coils being mounted on linear axes and being electrically connected in series, some of the coils having a large diameter and the remaining coils having a small diameter,
   said small coils alternating with said large coils and having their ends inserted in the ends of adjacent large coils,
   means including an integrating circuit for detecting current in the conductor by integrating the current induced in the sensing coils during the period of opening said housing from a closed position encompassing no conductor and thereafter enclosing the housing about the conductor,
   leads connecting said integrating circuit to said coils, and an output indicator connected to said integrating circuit.

7. Current-measuring apparatus according to claim 6 in which the axes of at least a portion of said coils lie at an obtuse angle to their adjacent coils to form said toroid.

8. Apparatus according to claim 6 in which the product of the number of turns per unit length times the area enclosed by a turn of the small coils is equal to that of the large coils.

9. The method of measuring current in a conductor located in a strong magnetic field without the necessity of contacting the conductor using the split sensing coil, an integrator circuit having storage and a meter for reading the value stored on the integrator circuit comprising the steps of,
   closing said split sensing coil in air to a position in which it encompasses no conductor and discharging any stored signal on the integrator circuit,
   opening said coil and thereafter closing said coil completely about said conductor, integrating the voltage induced in said coil over the period of closing said coil about said conductor, and indicating the integrated value of said voltage.

10. The method according to claim 9 further comprising the preliminary step of closing said coil in air adjacent said conductor.

* * * * *